United States Patent [19]

Doll

[11] Patent Number: 5,641,914

[45] Date of Patent: Jun. 24, 1997

[54] INDUCTIVE FLOW METER

[76] Inventor: Friedhelm Doll, Hoffnung 16, 42929 Wermelskirchen, Germany

[21] Appl. No.: 682,365

[22] Filed: Jul. 17, 1996

[30] Foreign Application Priority Data

Jul. 18, 1995 [DE] Germany .................. 29511556 U

[51] Int. Cl.$^6$ ...................................................... G01L 1/00
[52] U.S. Cl. ............................... 73/861.17; 73/861.12; 73/861.15
[58] Field of Search .......................... 73/861.11, 861.12, 73/861.13, 861.15, 861.16, 861.17

[56] References Cited

U.S. PATENT DOCUMENTS 3,783,686  1/1974  Hentschel ................. 73/194 EM
5,018,391  5/1991  Doll ........................... 73/861.17
5,400,660  3/1995  Doll ........................... 73/861.17

*Primary Examiner*—Richard Chilcot
*Assistant Examiner*—Ronald Biegel
*Attorney, Agent, or Firm*—Allen, Dyer, Doppelt, Milbrath & Gilchrist, P.A.

[57] ABSTRACT

The inductive flow meter and method of exciting a coil includes a coil with unipolar excitation, which generates exciting pulses having a pulse interval therebetween. The length of the pulse interval is shorter than that of an exciting pulse. The associated evaluation circuit includes two alternately clocked channels whose evaluation phases overlap each other in time, the measuring voltage being obtained at the ends of the signal paths by alternately sampling the channels.

12 Claims, 4 Drawing Sheets

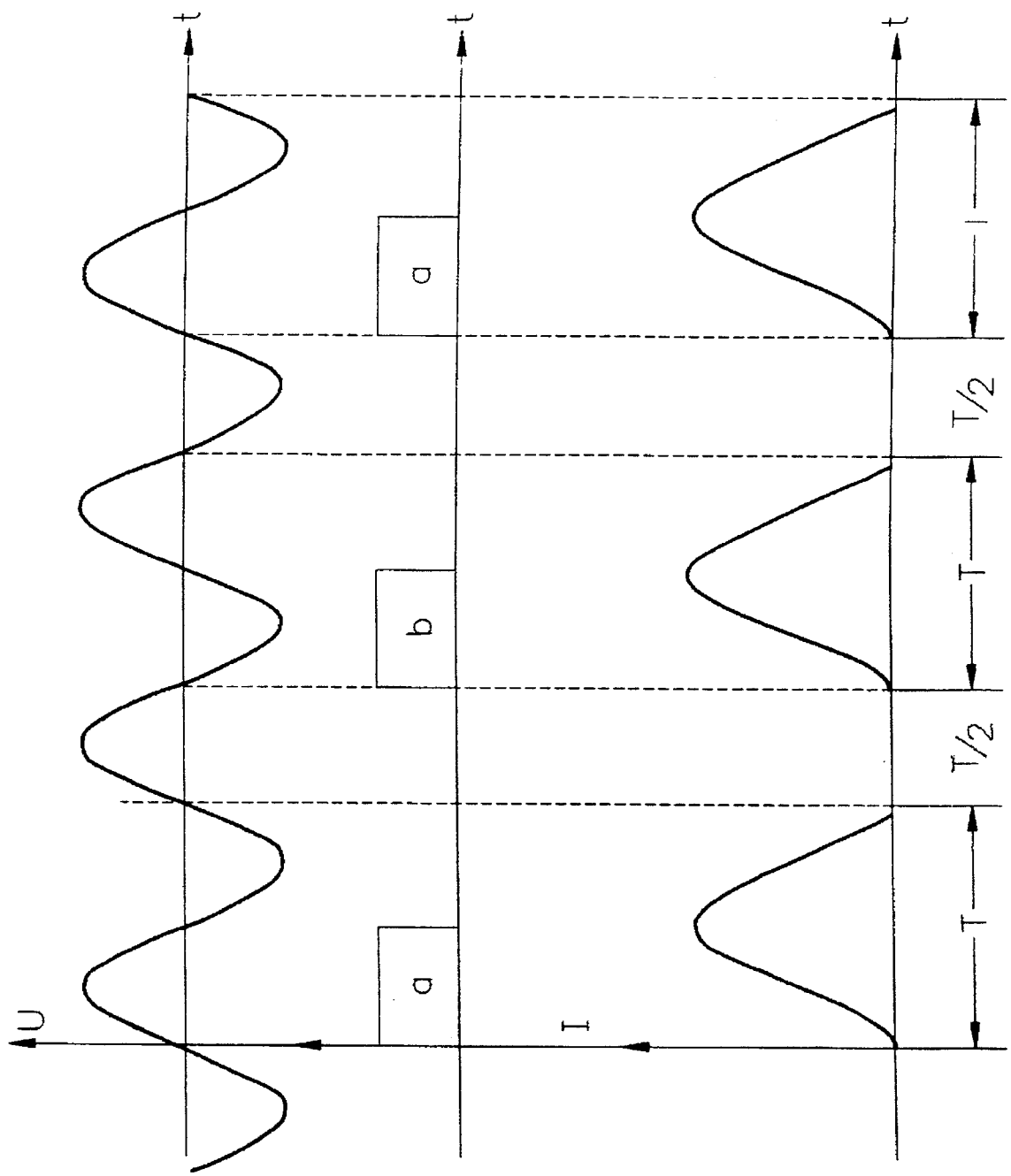

INDUCTIVE FLOW METER

FIELD OF THE INVENTION

The present invention relates to the field of flow meters.

BACKGROUND OF THE INVENTION

The invention relates to a magnetic-inductive flow meter with clocked excitation.

Inductive flow meters described in the U.S. Pat. Nos. 5,018,391 and 5,400,660, both granted to Doll, or in U.S. Pat. No. 3,783,686 operate in the form of clocked alternating field devices generating a magnetic field in the flowing liquid by supplying exciting pulses derived from the primary frequency to a coil. The clock frequency of the exciting pulses of the coil is about ⅓ to ⅒ of the primary frequency. The exciting current pulses generate pulses of magnetic field strength in the flowing medium. At electrodes which are in contact with the medium, an electric potential is generated whose magnitude is proportional to the field strength and the flow velocity. Thus, a measuring signal is obtained which is a measure of the flow velocity of the flowing medium. The reaction time of the flow meter depends on the clock frequency by which the coil is excited. Further, it has to be considered that numerous noise components occur, falsifying the measuring signal and impairing the measuring accuracy and stability of the flow signal.

SUMMARY OF THE INVENTION

In view of the foregoing background, it is therefore an object of the present invention to provide an inductive flow meter with an optimum noise suppression and a fast response time, with the exciting power being high.

In a flow meter according to the invention, the excitation of the coil is unipolar. This means that the coil sequentially generates field strength pulses of the same polarity. The interval length between two exciting pulses is smaller than the duration of one rapid succession, noises can be suppressed quickly and thus effectively and the flow meter has a short response time. i.e., changes in the measured value lead to a change in the measuring signal within a very short time.

The evaluation circuit includes two alternately clocked channels whose evaluation phases mutually overlap. Thereby, it is possible to update the measuring result in rapid succession although the evaluation phases are relatively long because of the required error compensation. With the response time being short, the flow meter supplies a stable output signal, without there being a necessity for compromises with respect to measuring accuracy, particularly with respect to the zero point.

The exciting power for the coil can be taken either from a power system, a low-voltage source operating with primary frequency or a d.c. voltage source. When a.c. voltage is used, the coil can be operated through four controlled rectifiers (thyristors) arranged as a Graetz circuit. In the case of a d.c. voltage source, transistors are suitable for controlling the coil.

When using a Graetz circuit, controllable rectifiers (e.g., thyristors) are used, which conduct current in one direction only. Thereby, the unipolar excitation of the coil is effected. Using a bridge of rectifiers conducting current in only one direction has the advantage of a greater security against primary short circuit because each of the bridge arms is provided with two diodes arranged in opposite directions, which can never conduct current simultaneously.

Within the scope of the subsequent description and the claims, the term "coil" does not only mean a single coil but also a coil array of several electrically connected coils.

BRIEF DESCRIPTION OF THE DRAWINGS

Hereinafter, an embodiment of the invention is explained in detail with reference to the drawings, in which:

FIG. 2 shows a diagram for explaining the function of the circuit illustrated in FIG. 1 according to a flow meter of the present invention;

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
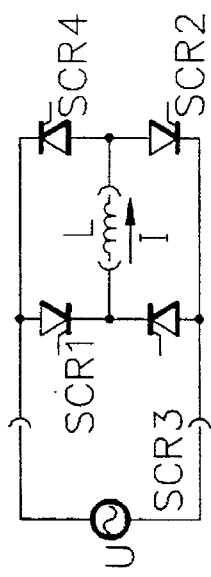
FIG. 1 is a circuit diagram of the exciting circuit for a coil generating the magnetic field according to a flow meter of the present invention.

As illustrated in FIG. 1, a Graetz circuit of four thyristors SCR1–SCR4 is connected to an a.c. voltage source supplying an a.c. voltage U. The coil L, in which a current I is generated, is connected to the bridge arm of the Graetz circuit. The thyristors SCR1, SCR2 being diagonally opposite one another are connected in series and polarized in the same sense. They are controlled in synchronism with each other. The two other thyristors SCR3, SCR4 diagonally arranged in the bridge circuit are also connected in series, with current direction being the same, and controlled in synchronism with each other.

FIG. 2 illustrates the time history of the a.c. voltage U. This voltage is, e.g., the primary voltage with a frequency of 50 Hz, the period being T=20 ms (milliseconds).

Further, ignition pulses a and b are shown. The ignition pulses a are those pulses by which the thyristors SCR1, SCR2 are controlled, SCR3, SCR4 are controlled. The ignition pulses a always begin in a positive half-wave of the voltage U, while the ignition pulses b begin at a negative zero passage of the voltage U and are offset with respect to the ignition pulses a by 3/2 T.

The coil current I generated is also shown in FIG. 2. It consists of unipolar current pulses, each beginning upon ignition of a pair of thyristors, rising first and then falling again. When the current pulse has fallen to zero, the respective pair of thyristors is put into the off-state. The exciting current pulses have a period of 1.5 T. This leads to the intended relatively fast clock frequency of ⅔ of the primary frequency. Thus, the clock frequency is higher by the factor of 2 to 10 than that of the known flow meters. Due to the high clock frequency, the signal-to-noise ratio is improved and the response time reduced.

Each of the pulses of the exciting current I has a length which is slightly shorter than the period length T of the supply voltage. This means that the duration of the exciting current pulses is shorter than the primary period. With a primary frequency of 50 Hz, the clock frequency of the magnetizing pulses generated by the coil L is 33.33 Hz. The time interval between the exciting current pulses, which is 0.5 times the primary period, is used to eliminate the substantial noise components occurring at the electrodes.

Figure 3:
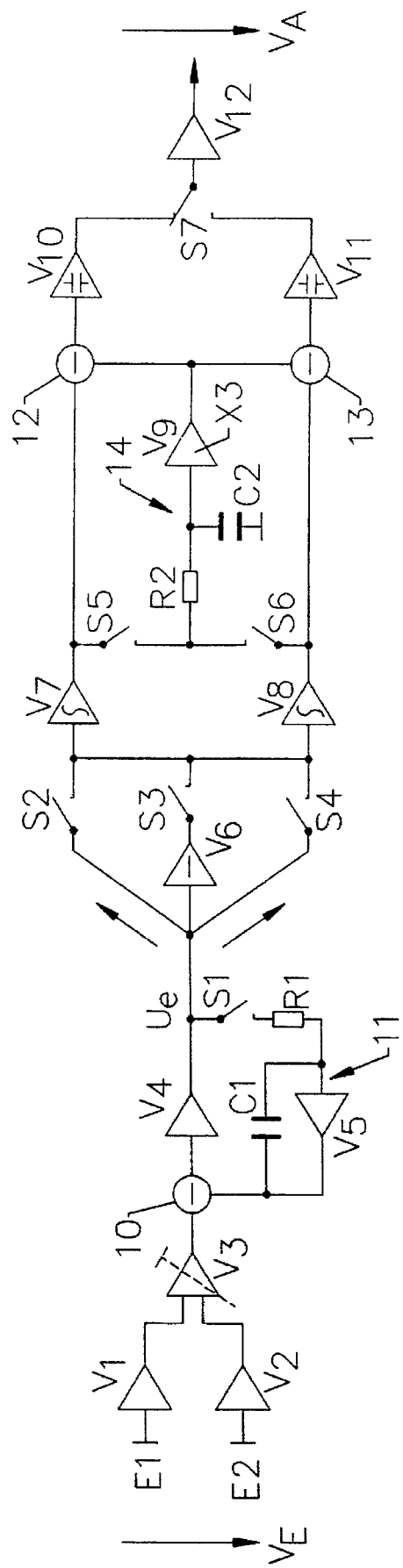
FIG. 3 is a schematic circuit diagram of an evaluation circuit of a flow meter according to the present invention.

The evaluation circuit is shown in FIG. 3. It comprises two electrodes E1 and E2, which are in contact with the flowing medium. The voltage $V_E$ to be measured is generated between these electrodes. The electrode E1 is connected to an input of a differential amplifier V3 via an amplifier V1. The electrode E2 is connected to the other input of the differential amplifier V3 via an amplifier V2.

The output of the differential amplifier V3 is connected to the input of an amplifier V4 via a subtracter 10. The output voltage $U_E$ of this amplifier V4 is fed back to the subtraction input of the amplifier V5, the resistor R1 and the capacitor C1. Hence, the output signal of the amplifier V4 is forced to be at zero whenever the switch S1 is controlled to be conductive.

The voltage $U_E$ is supplied to the two channels A and B, which are different signal paths in the analog technique which is described herein. In digital technique, the channels can be realized by software. Channel A includes a switch S2, an integrating amplifier V7, a subtracter 12 and a latch V10. Channel B includes a switch S4, an integrating amplifier V8, a subtracter 13 and a latch V11. The outputs of the two channels A and B are alternately sampled by an alternating switch S7 and supplied to an amplifier V12 providing the measuring signal $V_A$.

Further, the voltage $U_e$ is supplied to an inverter V6 changing its sign. Connected in series with the inverter V6 is a switch S3 being adapted to connect the output of the inverter with the inputs of the two integrating amplifiers V7 and V8. The outputs of the integrating amplifiers V7, V8 are connected, via one switch S5, S6 each, with a charging circuit 14 consisting of a resistor R2 and a capacitor C2. The charging signal of the capacitor C3 is connected to the subtraction inputs of the subtracters 12, 13 via an amplifier V9. The amplifier V9 amplifies the signal applied to its input by a constant factor which here has a value of "3" and will be explained hereinafter.

The evaluation circuit of FIG. 3 will be explained by the diagrams of FIG. 4. In FIG. 4a, the intervals of 0–5 are illustrated, which are cyclically repeated. Each interval has half the period length T/2 of the mains voltage U. FIG. 4b shows the time history of the field strength B in the measuring volume. With the flow being constant, this results in a corresponding time history of the signal voltage or flow voltage $U^N$ which is proportional to the field strength B.

In practice, the signal voltage is superposed by numerous noise quantities. The substantial noise quantities are the following:

(1) electrolytic d.c. voltage potential cause: barrier potential between liquid and electrode (2) coupled-in mains frequency cause: vagrant earth currents and line couplings (3) drift of the electrode potential cause: media change, contact of the electrode surface with solid particles or the like (4) transformative noise voltage cause: the voltage induced into the electrode loop and the measuring liquid by field change.

Moreover, there are also capacitive and ohmic error influences which, however, mostly play a minor part and can be suppressed by known measures such as shielding and use of high-quality insulating materials. The above-mentioned noise influences (1) through (4), however, are always present in a more or less distinctive form, and in the evaluation circuit of FIG. 3, they are suppressed by a combination of different measures.

The sum of flow-proportional signal voltage UN and different noise components, of which the drift is shown in FIG. 4c and the transformative noise voltage in FIG. 4d, is applied to the electrodes E1, E2. Via the input amplifiers V1 and V2, the electrode voltage is supplied to the differential amplifier V3 whose amplification can be adapted to the desired measuring range. This is followed by the amplifier V4, the integrator 11 being arranged in the feedback path thereof. At the beginning of the time intervals 1 and 4 of the time pattern, switch S1 of said integrator is momentarily (order of 0.2 ms) switched to be conductive. As a consequence, the output voltage $U_e$ of V4 is at zero at the beginning of each period of useful signals or excitation, as shown in FIGS. 4b and 4d.

Because the time constant of the switched integrator 11 suitably amounts to some seconds, this step compensates the interfering d.c. voltage of the input signal and the long-time drift thereof. As a whole, the amplified input signal $V_E$ is now applied to the output of amplifier V4, the momentary value being zero at the beginning of each exciting phase (intervals 1 and 4). Thus, the interfering d.c. voltage is eliminated, which is required in connection with the zero correction treated later on. Coupled-in primary voltages are suppressed in the known way by the fact that the integration times of the integrating amplifiers V7, V8 correspond to the primary period T.

Subsequent to the amplifier V4, a division into the two channels A and B is effected, each signal path evaluating only every second useful signal pulse. This means that signal path A evaluates, for example, the useful signal phase in the time intervals 1 and 2, while signal path B evaluates the useful signal phase in the intervals 4 and 5. Dividing the signal paths is necessary because the evaluation times of the two channels including the drift correction extend over four time intervals each and do thus overlap. This becomes clear from the following explanation:

The integrators V7 and V8 mainly function to integrate the useful signal pulses. Integrator V7, for example, integrates the useful signal appearing in the time intervals 1 and 2, i.e., in this time, switch S2 is closed. Switch S4 of integrator V8 is closed during the time intervals 4 and 5. Now, these integrators are supposed to not only add up the useful signal, but also to suppress rapidly passing noises. For the sake of simplicity, such a noise is shown in FIG. 4c as a linear voltage variation or drift over the two primary periods of the intervals 0 to 3. This drift is eliminated as follows:

V6 inverts the output signal of V4. Switch S3 is closed during the time intervals 0 and 3. This means that the areas integrated during the intervals 0 and 3 are subtracted from the areas of the superposing the signal voltage is eliminated by means of this subtraction the result of which is "zero".

This means that in this operation, the evaluation phase in channel A was completed with the time interval 3, while the completely analog operation in channel B starts with time interval 3. This means that the evaluation phases of the two channels with a length of four time intervals overlap each other in the time interval 3 and 0, respectively. As a consequence, the integrators in channels A and B provide current measuring values freed from slow and fast noises every three time intervals (=30 ms in case of 50 Hz primary).

The previously described method of fast noise compensation by V6, however, is not suitable for eliminating a zero error caused by the eddy current component in the transformative noise voltage. On the contrary, this method even increases the zero error based on the eddy current effects.

Figure 4:
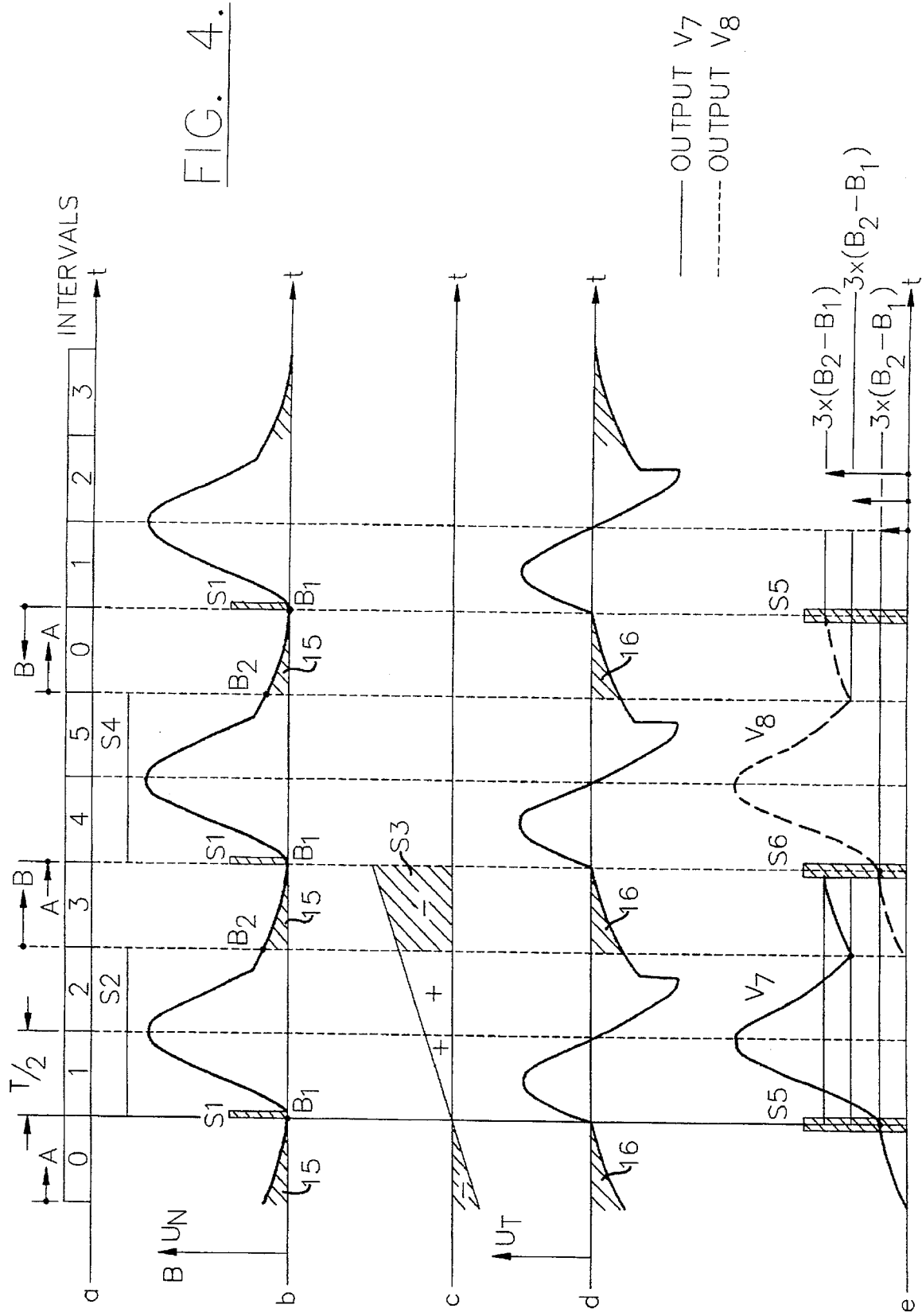
FIGS. 4(a–e) illustrates schematic diagrams for explaining the operation of an evaluation circuit of a flow meter according to the present invention.

This fact is explained in FIG. 4: FIG. 4b shows the course of magnetic field B with eddy current appendix 15 (hatched), FIG. 4d shows the course of the transformative voltage as it occurs at the output of amplifier V4. The curve of FIG. 4d is the derivation of the curve of FIG. 4b, i.e., $U_T$=dB/dt, where $U_T$ is the transformative noise voltage. The eddy current appendix 16 is hatched. FIG. 4e shows the integration result of the noise voltage at the output of the integrators V7 and V8.

As can be seen in FIG. 4e, the integration result of the transformative noise signal is an error amount proportional to "3"(B2–B1). B2 and B1 are the field strengths at the beginning and end of the eddy current appendix. If there is no eddy current, as approximately is the case with small nominal widths of the pipe of the flow channel, it applies that B2=B1, so that the above-mentioned error amount disappears. Generally, however, eddy currents do appear, which requires a correction of the error amount of 3k(B2–B1). Here, k is a constant. According to the invention, the quantity k(B2–B1) available at the output of the integrators V7 and V8 at certain times, is averaged by the charging circuit 14 over a long time and multiplied by a value amounting to about 3 by the amplifier V9. The multiplication result is subtracted from the above integration result of the integrating amplifiers V7 and V8.

Mathematically, the error quantity 3k(B2–B1) can be explained through the dB/dt noise added up over the evaluation interval 0 to 3 according to the following calculation:

| time interval 0 (inverted): | $-\int dB/dt\ dt = k(B2 - B1)$ |
| time intervals 1 and 2: | $\int dB/dt\ dt = k(B2 - B1)$ |
| time interval 3 (inverted): | $-\int dB/dt\ dt = k(B2 - B1)$ |
| sum | $= 3k\ (B1 - B1)$ |

From FIG. 3, the function of the noise suppression measure can be seen. At the end of time interval 0, switch S5 closes and thus takes over the quantity k(B2–B1) from V7. The same happens when switch S6 closes at the end of the time interval 3. Here, too, the quantity k(B2–B1) is taken over, from V8 this time. Now, the capacitor C2 is slowly charged—depending on the time constant R2C2 and the closing duration of the switches S5 and S6 —to the value k(B2–B1), rapid interfering actions having no influence due to the inertia of this operation. The inert (slow) average value of k(B2B1) now obtained is multiplied by the amplifier V9 by the factor of 3 and then subtracted in the latches V10 and V11 from the output signals of the integrators V7 and V8. Thus, the error amount disappears and the zero correction is completed.

The useful signals now stored in the latches V10 and V11, with zero correction and freed from noise signals, are identical and are connected to the output stage V12 via the switch V7. Switch S7 switches to and from between channel A and B with a period of 1.5 T. It connects channel A with the output stage during the time intervals 4,5,0 and channel B with the output stage during the time intervals 1,2,3, so that the measuring value updated every 1.5 T is transferred to the output. It goes without saying that the analog circuit design illustrated in FIG. 3 can also be realized in digital technique.

The method described can be applied virtually unchanged even if the magnet is not supplied with primary voltage but with a low voltage of mains frequency—about 24 VAC. The magnet may also be supplied from a d.c. voltage source, e.g., 24 VDC. In this case, however, the thyristor bridge has to be replaced by a transistor bridge.

Figure 5:
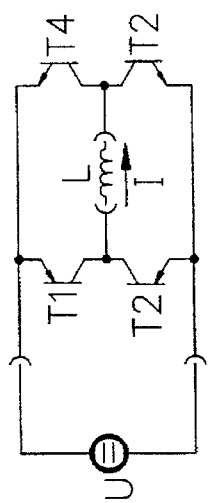
FIGS. 5 and 6 illustrate further embodiments of an exciting circuit of a flow meter according to the present invention.

Such a concept is shown in FIG. 5. Here, a d.c. voltage source is provided supplying a d.c. voltage U to a Graetz circuit consisting of four transistors To, T2, T3 and T4. The coil L, through which the coil current I flows, is connected into the bridge arm of the Graetz circuit.

Figure 6:
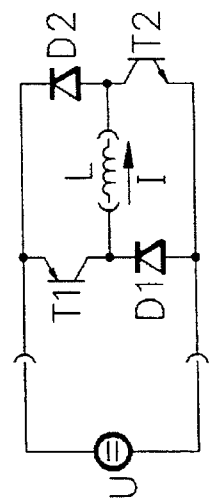

The circuit according to FIG. 6 has the same configuration as that according to FIG. 5, except that the transistor T3 is replaced by a diode Do and the transistor T4 by a diode D2.

Figure 7:
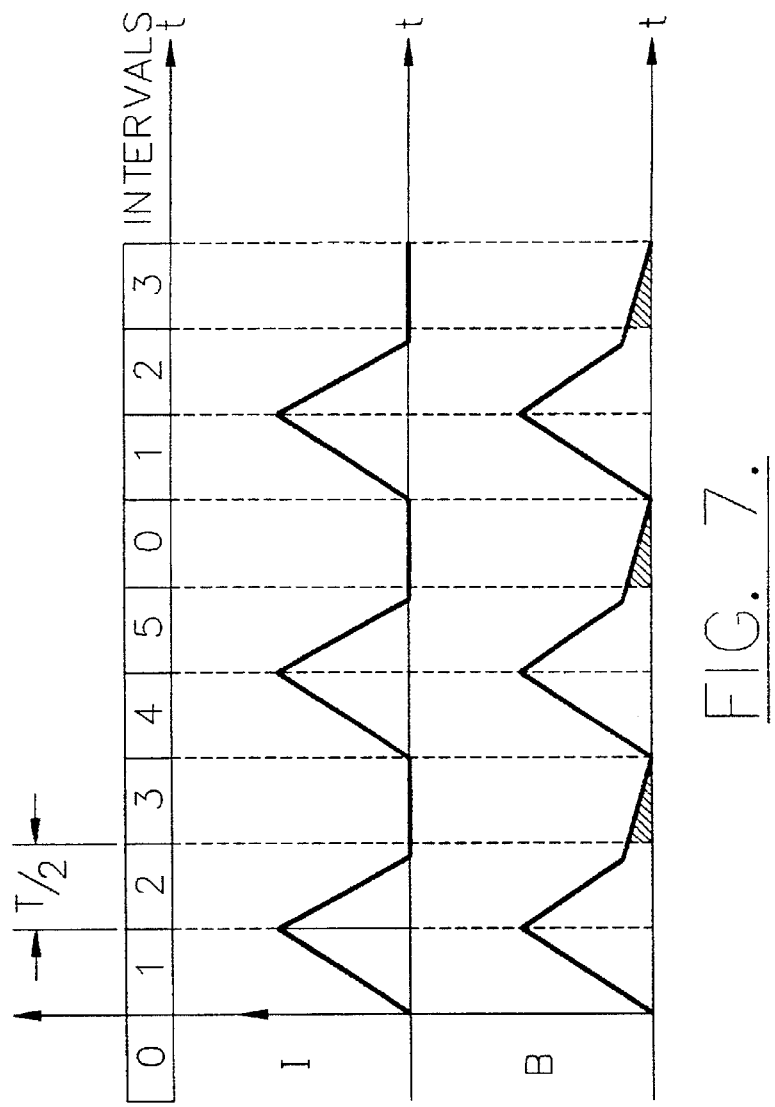
FIG. 7 is a schematic diagram of exciting circuits illustrated in FIGS. 5 and 6 of a flow meter according to the present invention.

FIG. 7 shows the time histories of the coil current I and the magnetic field strength B with reference to the intervals. The coil current (exciting current) and the magnetic strength no longer have a sinusoidal course (as in FIGS. 2 and 4), but a sawtoothed course which results in a sawtooth excitation.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An inductive flow meter comprising:
   at least one coil for generating a magnetic field in a flow region of a liquid, said coil being positioned for a periodical and unipolar excitation so that a pulse interval between two exciting pulses is less than that of an exciting pulses;
   a plurality of electrodes positioned in the flow region; and
   an evaluation circuit connected to electrodes for generating a measured signal from the electrical field induced in the liquid, said evaluation circuit including two channels whose evaluation phases overlap each other in time, a measuring voltage being obtained from the channels by alternately sampling outputs of the channels.

2. An inductive flow meter as defined in claim 1, further comprising a rectifier bridge connected to said coil and having a plurality of rectifiers connected as a Graetz circuit, two rectifiers of said plurality of rectifiers conducting current in the same direction and being arranged diagonally to each other rin said rectifier bridge circuit.

3. An inductive flow meter a defined in claim 1, further comprising detecting means connected to at least one channel of said evaluation circuit for detecting an error amount caused by eddy currents in the pulse intervals, and wherein the error amount is subtracted from the signal of this channel after being multiplied by a factor, to thereby reduce transformative noises.

4. An inductive flow meter as defined in claim 3, wherein said detecting means comprises a charging circuit having a charging time constant.

5. An inductive flow meter as defined in claim 1, further comprising an input signal connected to an inverter which is switched on outside the evaluation phases of the two channels and switched off in the evaluation phases, and whose output signal is coupled into both channels to thereby reduce drift-like noises.

6. An inductive flow meter as defined in claim 1, wherein the exciting pulses each have a length of about one a.c. voltage period and succeed each other with a period duration of 1.5 times the a.c. voltage period.

7. An inductive flow meter comprising:
   at least one coil for generating a magnetic field in a flow region of a liquid, said coil being positioned for a periodical and unipolar excitation so that a pulse interval between two exciting pulsed is less than that of an exciting pulse;
   a rectifier bridge connected to said coil and having a plurality of rectifiers connected as a Graetz circuit, two rectifiers of said plurality of rectifiers conducting current in the same direction and being arranged diagonally to each other in said rectifier bridge circuit;
   a plurality of electrodes positioned in the flow region;
   an evaluation circuit connected to electrodes for generating a measuring signal from the electrical field induced in the liquid, said evaluation circuit including two channels whose evaluation phases overlap each other in time, the measuring voltage being obtained from the channels by alternately sampling the channel outputs; and
   detecting means connected to at least one channel of said evaluation circuit for detecting an error amount caused by eddy currents in the pulse intervals, and wherein the error amount is subtracted from the signal of this channel after being multiplied by a factor, to thereby reduce transformative noises.

8. An inductive flow meter as defined in claim 7, wherein said detecting means comprises a charging circuit having a charging time constant.

9. An inductive flow meter as defined in claim 8, further comprising an input signal connected to an inverter which is switched on outside the evaluation phases of the two channels and switched off in the evaluation phases, and whose output signal is coupled into both channels to thereby reduce drift-like noises.

10. An inductive flow meter as defined in claim 9, wherein the exciting pulses each have a length of about one a.c. voltage period and succeed each other with a period duration of 1.5 times the a.c. voltage period.

11. A method of exciting a coil of an inductive flow meter comprising:
   providing a periodical unipolar excitation of a coil so as to generate a magnetic field in a flow region of a liquid, the length of the pulse interval between two exciting pulses being shorter than that of an exciting pulse;
   providing a plurality of electrodes positioned in the flow region; and
   generating a measuring signal from the electrical field induced in the liquid by an evaluation circuit connected to the plurality of electrodes, the evaluation circuit including two channels whose evaluation phases overlap each other in time, a measuring voltage being obtained from the channels by alternately sampling outputs of the two channels.

12. A method as defined in claim 11, further comprising detecting an error amount caused by eddy currents in the pulse intervals, and wherein the error amount is subtracted from the signal of this channel after being multiplied by a factor, to thereby reduce transformative noises.

* * * * *